(12) United States Patent
Robert et al.

(10) Patent No.: US 10,557,952 B2
(45) Date of Patent: Feb. 11, 2020

(54) ACCELEROMETER DEVICE

(71) Applicant: THALES, Courbevoie (FR)

(72) Inventors: Christophe Robert, Sophia Antipolis (FR); Thomas Fini, Sophia Antipolis (FR); Fabienne Lebreil, Sophia Antipolis (FR); Hervé Le Gras, Sophia Antipolis (FR); Isabelle Tournoud, Sophia Antipolis (FR)

(73) Assignee: THALES, Courbevoie (FR)

( * ) Notice: Subject to any disclaimer, the term of this patent is extended or adjusted under 35 U.S.C. 154(b) by 369 days.

(21) Appl. No.: 15/325,041

(22) PCT Filed: Jul. 8, 2015

(86) PCT No.: PCT/EP2015/065589
§ 371 (c)(1),
(2) Date: Jan. 9, 2017

(87) PCT Pub. No.: WO2016/008782
PCT Pub. Date: Jan. 21, 2016

(65) Prior Publication Data
US 2017/0205519 A1    Jul. 20, 2017

(30) Foreign Application Priority Data

Jul. 18, 2014   (FR) .................................... 14 01618

(51) Int. Cl.
*G01V 1/00*    (2006.01)
*G01V 1/16*    (2006.01)
(Continued)

(52) U.S. Cl.
CPC .............. *G01V 1/164* (2013.01); *G01P 15/18* (2013.01); *G01P 21/00* (2013.01); *G01V 1/201* (2013.01)

(58) Field of Classification Search
None
See application file for complete search history.

(56) References Cited

U.S. PATENT DOCUMENTS

2007/0258330 A1    11/2007   Berg et al.
2008/0300821 A1*   12/2008   Frank ..................... G01V 1/201
                                                        702/150
(Continued)

FOREIGN PATENT DOCUMENTS

FR          2 979 150 A1      2/2013
WO       2006/076499 A1      7/2006

*Primary Examiner* — Hovhannes Baghdasaryan
(74) *Attorney, Agent, or Firm* — Baker & Hostetler LLP

(57) ABSTRACT

An accelerometer device for determining the acceleration of an object, along three axes X, Y and Z of a main orthonormal reference system and subject to a surrounding pressure, comprises a number N of accelerometer sensors of MEMS type, N at least equal to two, each sensor defined by construction in an auxiliary reference system comprising three orthonormal axes, the set of accelerometer sensors comprising at least one pair of sensors mounted to face in opposite directions and parallel to one another, and: for each of the pairs of accelerometer sensors, the sensors have components of opposite sign along two axes of the main reference system; and the axes of the reference system along which the components of the accelerometer sensors oppose the set of pairs of sensors in twos comprise at least two of the three axes X, Y and Z of the reference system, to compensate for the effect of the pressure on at least two axes of the reference system.

13 Claims, 8 Drawing Sheets

(51) Int. Cl.
*G01P 15/18* (2013.01)
*G01P 21/00* (2006.01)
*G01V 1/20* (2006.01)

(56) References Cited

U.S. PATENT DOCUMENTS

| | | |
|---|---|---|
| 2009/0326851 A1 | 12/2009 | Tanenhaus |
| 2011/0310698 A1 | 12/2011 | Maples et al. |
| 2012/0215477 A1* | 8/2012 | Tuck ..................... G01P 21/00 702/99 |
| 2013/0044565 A1* | 2/2013 | Barr ..................... G01P 15/09 367/20 |
| 2015/0016216 A1* | 1/2015 | Sudow ................... G01P 21/00 367/13 |

* cited by examiner

ACCELEROMETER DEVICE

CROSS-REFERENCE TO RELATED APPLICATIONS

This application is a National Stage of International patent application PCT/EP2015/065589, filed on Jul. 8, 2015, which claims priority to foreign French patent application No. FR 1401618, filed on Jul. 18, 2014, the disclosures of which are incorporated by reference in their entirety.

FIELD OF THE INVENTION

The invention generally relates to measurement systems and, in particular, to an accelerometer device for measuring the acceleration along three axes of an object mechanically connected to a measurement system.

PRIOR ART BACKGROUND

Surface and submarine vessels are generally equipped with acoustic antennas for transmitting and/or receiving acoustic signals being propagated through the sea. An acoustic antenna is formed from a set of sensors (hydrophones) that can be accessed separately, i.e. the outputs of which may be combined in various ways.

The acoustic antennas thus comprise a set of hydrophones which may be arranged in the acoustic modules of the antenna in various combinations depending on the configuration of the antenna.

For example, a towed linear acoustic antenna (ALR or flute antenna) may be of a substantial length, measuring several hundreds of meters, and of small diameter. Such an antenna is towed by a towing cable of many hundreds of meters and is intended to be submerged up to quite substantial sea depths (the pressure increasing by one bar for every 10 m in depth). Owing to its length, such an antenna comprises a substantial number of hydrophones which are regularly distributed along the antenna in acoustic modules. It is known practice, for example, to arrange an elementary acoustic multisensor along the flute antenna in a separate acoustic module in order to remove the left/right ambiguity found in submarine acoustics. Each acoustic module is protected by a protective module, which is of small dimensions owing to the small diameter of the flute antenna. Each independent acoustic multisensor is mounted on a printed circuit board (concentrator system) at one end thereof and perpendicularly to the plane of the board. The acoustic module may additionally comprise multiple auxiliary pieces of equipment, such as depth and direction sensors, and pieces of electronic equipment which are mounted on the concentrator system, in the small space delimited by the protective enclosure of the acoustic module.

The acoustic multisensors are, in this case, designed to deliver electrical signals which are proportional to the dynamic pressures exerted thereon. However, their accelerometric sensitivity must be known so that the delivered signals are referenced according to terrestrial acceleration forces. This acceleration reference is obtained through the use of an acceleration sensor (also referred to as an accelerometer) mounted on the concentrator in combination with each acoustic multisensor and delivering a signal representative of the acceleration of the flute along two axes, and through compensation for the effect of this acceleration in a differential manner over the signals delivered by each acoustic multisensor. Such an accelerometer makes it possible to determine the biaxial acceleration of the object to which it is fixed for a horizontal antenna.

Such accelerometers are expensive. In particular, in the case of a flute antenna, the accelerometers are generally arranged in a known manner along the antenna, generally every 2 m for interpolation. Furthermore, for each acoustic multisensor, an accelerometer is provided on the same concentrator along with other electronic components of the acoustic module so as to avoid interpolation. Taking the length of the antenna into account, the number of accelerometers required and, consequently, the cost incurred by the set of these accelerometers may thus be very substantial.

Another drawback of these accelerometers is their bulk with respect to the volume of the enclosure of the acoustic module (itself limited by the small diameter of the flute antenna). In particular, it may be useful to stack multiple printed circuit boards and to integrate them within each acoustic module by connecting the acoustic multisensor to each of the stacked boards, thereby making it possible to ensure the continuous operation of the multisensor in the event of failure. However, the current bulk of conventional accelerometers (in the direction perpendicular to the axis of the antenna) and their number would not allow such a stack.

GENERAL DEFINITION SUMMARY OF THE INVENTION

The invention improves the situation. To this end, an accelerometer device is proposed for determining the acceleration of an object to which the accelerometer device is mechanically connected, along three axes X, Y and Z of a main orthonormal reference system (X, Y, Z) comprising three axes X, Y, Z, said object being subject to a surrounding pressure. The device comprises a number N of accelerometer sensors of MEMS type, the number N of accelerometer sensors being at least equal to two, each sensor being defined by construction in an auxiliary reference system comprising three orthonormal axes (Xi, Yi, Zi), the set of accelerometer sensors comprising at least one pair of sensors mounted so that they face in opposite directions and are substantially parallel to one another, and:

for each of the pairs of sensors, the sensors have, in twos, components of opposite sign along two axes of the main reference system; and the axes of the reference system along which the components of the accelerometer sensors oppose the set of pairs of sensors in twos comprise at least two of the three axes X, Y and Z of the reference system, thereby making it possible to compensate for the effect of the pressure on at least two axes of the reference system.

According to another feature, the device may comprise a processing unit for calculating the mean of the accelerations along each axis X, Y and Z, the mean of the accelerations along a given axis being determined from the accelerations determined by each accelerometer sensor along the given axis.

The calculation of the mean of the accelerations along a given axis may additionally account for the gain and/or the offset of each sensor predetermined in a unit calibration phase implemented separately for each sensor before mounting.

The calculation of the means of the accelerations along a given axis also takes into account a predefined gain compensation factor.

In one embodiment, the set of sensors may comprise two accelerometer sensors connected to at least one printed circuit board, while the axes of the reference system along which the components of the sensors oppose the set of sensors in twos comprise two of the three axes X, Y and Z of the reference system, thereby making it possible to correct for the effect of the pressure which is exerted on the object along the two axes.

In another embodiment, the set of accelerometer sensors may comprise three sensors, while the axes of the reference system along which the components of the sensors are opposed in twos over the set of sensors comprise the three axes X, Y and Z of the reference system, thereby making it possible to correct for the effect of the pressure which is exerted on the object along the three axes.

According to one feature of the invention, the object may be an acoustic antenna comprising a set of acoustic multisensors, each acoustic multisensor being mounted on at least one printed circuit board, while the accelerations determined by the accelerometer device along each axis X, Y and Z are used to compensate for the effect of the acceleration of the acoustic antenna on the position of the acoustic multisensor.

The sensitivity of the sensors to pressure may vary.

The invention additionally proposes an acoustic module for an acoustic antenna extending along a main axis, comprising an accelerometer device according to one of the previous features, the accelerations determined by the accelerometer device along each axis X, Y and Z being used to compensate for the effect of the acceleration of the acoustic antenna on the position of the acoustic multisensor.

The acoustic sensor may be an acoustic multisensor with an axis that is substantially parallel to the axis of the antenna.

The acoustic module may comprise at least one printed circuit board on which the accelerometer sensors are mounted.

The module may comprise a plurality of printed circuit boards, stacked so as to be substantially perpendicular to the axis of the antenna, on which the accelerometer sensors are mounted.

The invention additionally proposes an acoustic antenna, comprising a set of acoustic modules according to one of the preceding features.

The invention thus provides a low-bulk accelerometer device. The use of such a device in an acoustic module of an antenna thus makes it possible to stack multiple printed circuit boards in one and the same module.

Another advantage of the accelerometer device according to the invention is its low cost. Such a device is thus particularly suitable for use in an antenna employing a substantial number of acoustic modules.

The accelerometer device also allows the system to be made more reliable through self-referencing, i.e. comparison with respect to a duel reference and calibration with respect to the acceleration due to gravity.

DESCRIPTION OF THE FIGURES

Other features and advantages of the invention will become apparent with the aid of the description which follows and the figures of the appended drawings in which.

The drawings and the annexes to the description will be able not only to aid in better understanding the description, but also to contribute to the definition of the invention, as appropriate.

DETAILED DESCRIPTION

Figure 1:
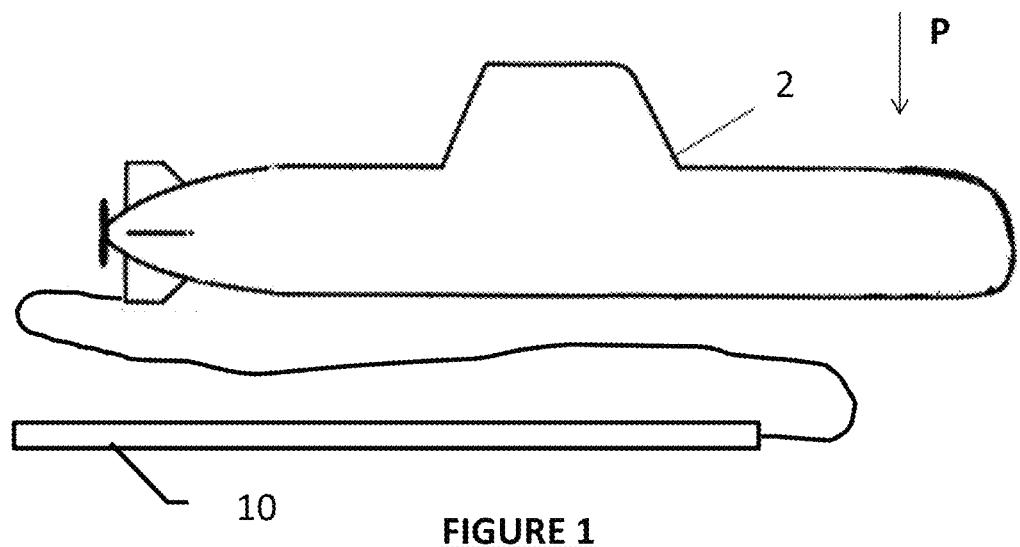
FIG. 1 shows an exemplary environment in which certain embodiments of the invention may be implemented.

FIG. 1 shows an exemplary environment in which certain embodiments of the invention may be implemented.

Surface and submarine vessels 2 are generally equipped with a set of acoustic antennas for transmitting and/or receiving acoustic signals through the sea, such as for example flute antennas 10 which benefit from freedom of movement, distributed antennas or flank antennas. In order to facilitate the description of embodiments of the invention, the rest of the description will be given with reference to a flute antenna 10 by way of non-limiting example.

Figure 2:
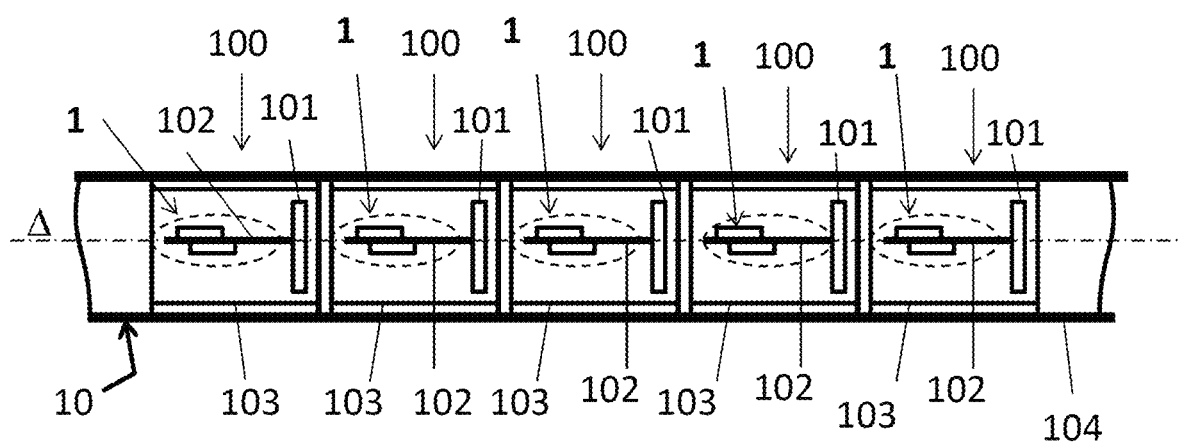
FIG. 2 is a schematic representation of the acoustic modules of a flute antenna, according to certain embodiments of the invention.

FIG. 2 shows a segment of a flute antenna 10 comprising a set of acoustic modules 100. The flute antenna 10 additionally comprises a set of acoustic sensors 101 (for example of hydrophone type) distributed regularly along the antenna in the acoustic modules 100. In the embodiment of FIG. 2, an acoustic sensor 101 is arranged at regular intervals along the flute antenna in a separate acoustic module 100.

In each acoustic module 100, comprising one or more acoustic sensors 101, at least one printed circuit board 102 (also referred to as a "concentrator system"), for example generally rectangular in shape, is arranged along the axis of the antenna. The acoustic sensors 101 may be, for example, acoustic multisensors. In one particular embodiment, the sensors 101 of acoustic multisensor type 101 may comprise N hydrophones, which are located in a plane perpendicular to the axis 4 of the linear antenna and are distributed on a circle centered on the axis of the antenna, and have a diameter that is smaller than the diameter of the antenna.

Each acoustic sensor 101 may be mechanically or electrically connected to at least one board 102 for its electrical interface. In a variant, each acoustic module 100 may comprise a plurality of printed circuit boards stacked in the direction perpendicular to the axis of the antenna and mechanically and electrically connected to the acoustic sensor 101 such that, in the event of the failure of one of the boards, the other boards may continue to interface with the acoustic sensor. The mechanical position of each board 102 is rigidly connected to the acoustic sensor 101. The rest of the description will be given with reference to a single printed circuit board 102 and to an acoustic sensor 101 of multisensor type, by way of non-limiting example.

Each acoustic module 100 may be protected by an enclosure 103 (also referred to as an "acoustic centering device")

of small dimensions. The height of the enclosure 103 may be, for example, limited by the small diameter of the antenna 10, in the case of a flute antenna. Each acoustic sensor 101 may be mounted on the concentrator system 102. In FIG. 2, each acoustic multisensor 101 is mounted at one end of the concentrator system and perpendicularly to the plane of the concentrator in order to optimize the way in which the space delimited by the enclosure 103 of the acoustic module is occupied. The acoustic multisensors are configured to deliver electrical signals which are proportional to the dynamic pressures exerted thereon.

Each acoustic module 100 may additionally comprise multiple pieces of auxiliary electronic equipment.

The flute antenna 10 may, in particular, be equipped with a protective envelope 104 intended to protect the pieces of electronic equipment. It may contain, in particular, a liquid of lower density than water and of very high resistivity (such as oil, for example) in order to prevent the envelope and its contents being crushed. Such a liquid allows, in particular, the buoyancy of the antenna to be substantially zero and the pressure inside the antenna to be equalized with the exterior.

According to one aspect of the invention, each acoustic module 100 may comprise an accelerometer device 1 for determining the acceleration of the antenna 10 along three axes X, Y and Z defining an orthonormal main reference system and in order to compensate for the effect of the acceleration on the signal delivered by each acoustic multisensor 101. When applying the invention to acoustic antennas, the X axis corresponds to the roll axis, the Z axis corresponds to the pitch axis and the Y axis corresponds to the yaw axis.

Figure 3:
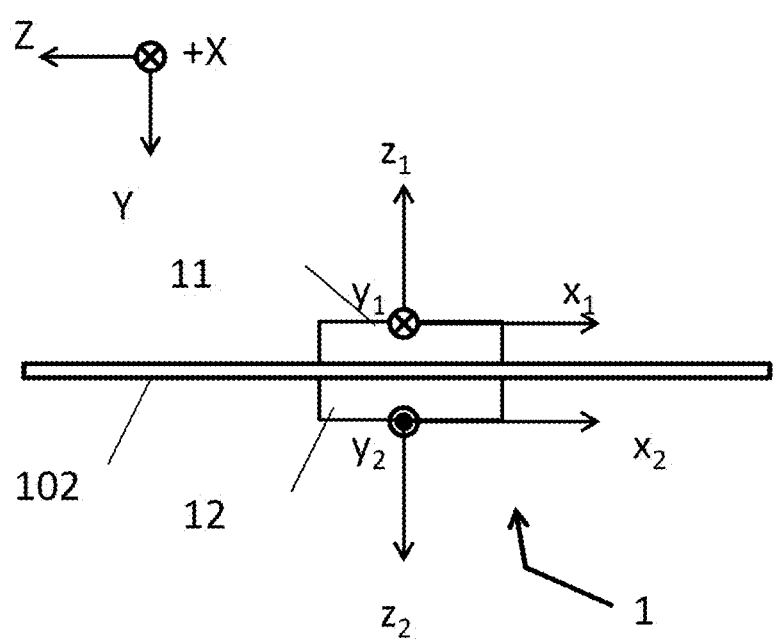
FIG. 3 is a schematic view of the accelerometer device according to one embodiment of the invention.

FIG. 3 is a schematic view of the accelerometer device 1 according to one embodiment of the invention showing the main reference system (X, Y, Z). The accelerometer device 1 comprises a set of digital accelerometer sensors 11, 12 of electronic microsystem (also referred to as MEMS) type. The MEMS accelerometer sensors 11 and 12 may be mounted on at least one printed circuit board 102 and so as to be substantially parallel to one another. The accelerometer sensors may be, for example, generally rectangular in shape and of very low height. In one embodiment, the accelerometer device may be rigidly mounted on the same printed circuit boards 102 as the acoustic sensor 101. In the following description of certain embodiments, reference will be made to a printed circuit board 102 commonly connected to the acoustic sensor 101 and to the accelerometer device 1 by way of illustrative example.

According to one aspect of the invention, the accelerometer device 102 comprises at least one pair of accelerometer sensors 11 and 12 arranged so that they face in opposite directions with respect to one another. The sensitivity of the sensors 11 and 12 to pressure may vary. In one embodiment, the pair of sensors facing in opposite directions comprises two sensors 11 and 12 arranged on either side of the printed circuit board 102 (also referred to as the "upper sensor" and "lower sensor", respectively) as shown in FIG. 3.

Each accelerometer sensor 11 and 12 is associated by construction with a sensor reference system $(X_i, Y_i, Z_i)$ which allows the positioning of the accelerometer sensor to be defined. The plane $(X_i, Y_i)$ defines the plane of each accelerometer sensor. Each accelerometer sensor is arranged in the device 1 such that its plane $(X_i, Y_i)$ is parallel to the plane (X, Z) of the reference system.

Figure 4:
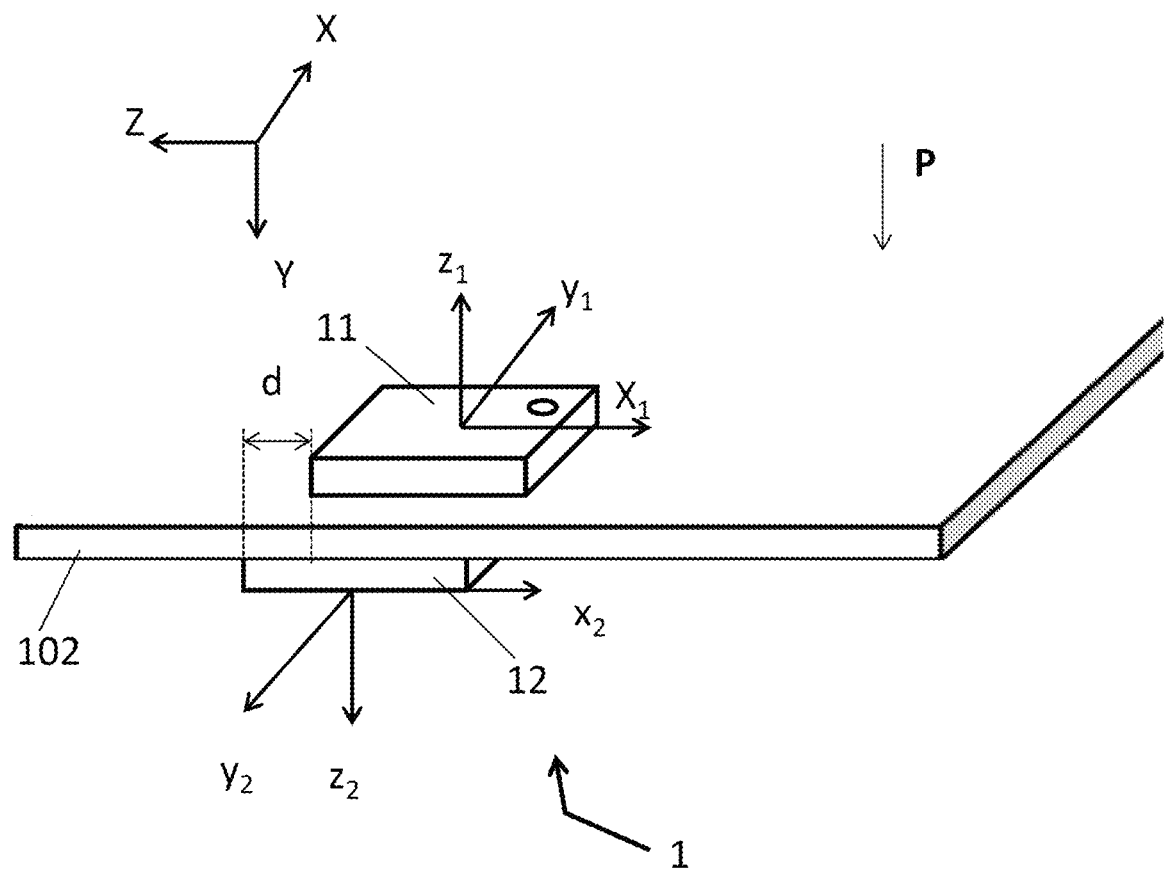
FIG. 4 shows the arrangement of the accelerometer sensors facing in opposite directions in a main reference system, according to one embodiment of the invention.

The accelerometer sensors 11 and 12 mounted so as to face in opposite directions may be opposite each other with respect to the axis of the antenna or arranged at a chosen distance d away from one another with respect to the axis of the antenna, as shown in FIG. 4. The distance d may be chosen depending on the orientation of the support plane (for example, it may be larger or smaller depending on whether or not the support plane is parallel). Furthermore, the accelerometers may be fixed to the board 102 (fixed by means of welding, for example) so as to limit errors.

In the examples shown in FIGS. 3 and 4, the reference system of the upper sensor 11 is denoted by (X1, Y1, Z1) while the reference system of the lower sensor 12 is denoted by (X2, Y2, Z2). The positioning of the two sensors 11 and 12 so as to face in opposite directions relative to one another is such that the respective axes Z1 and Z2 of the first sensor 11 and of the second sensor 12 are parallel and of opposite signs.

As used here with respect to an accelerometer device with N sensors, the term "facing in opposite directions" refers to the mounting of the accelerometer sensors from among the N sensors such that:

for each pair of sensors considered, the sensors have, in twos, components of opposite sign along two axes of the main reference system (for example, the axis Z1 of the upper accelerometer sensor 11 corresponds to the axis −Z2 of the lower accelerometer sensor 12 and the axis Y1 of the upper accelerometer sensor 11 corresponds to the axis −Y2 of the lower accelerometer sensor 12); and the axes of the main reference system along which the components oppose the set of pairs of sensors comprise at least two of the three axes X, Y and Z of the reference system.

Positioning the sensors in such a way makes it possible to correct for the effect of the pressure exerted on the antenna on at least two axes.

With reference to FIG. 4, the positioning of the accelerometer sensors 11 and 12 with respect to the main reference system (X, Y, Z) is such that:

the axis X1 of the first accelerometer sensor 11 coincides with the axis −Z of the main reference system;

the axis Y1 of the first accelerometer sensor 11 coincides with the axis X of the main reference system;

the axis Z1 of the first accelerometer sensor 11 coincides with the axis −Y of the main reference system;

the axis X2 of the second accelerometer sensor 12 coincides with the axis −Z of the main reference system;

the axis Y2 of the second accelerometer sensor 12 coincides with the axis −X of the main reference system;

the axis Z2 of the second accelerometer sensor 12 coincides with the axis Y of the main reference system.

Thus, when the accelerometer device comprises two sensors 11 and 12 (2D assembly), the mounting of the two accelerometer sensors so as to face in opposite directions is such that the two sensors have components of opposite sign along two axes of the main reference system (for example, the axis +Z1 of the upper accelerometer sensor 11 corresponds to the axis −Z2 of the lower accelerometer sensor 12 and the axis +Y1 of the upper accelerometer sensor 11 corresponds to the axis −Y2 of the lower accelerometer sensor 12). Thus, two axes out of the three axes of the main reference system face in opposite directions (Y corresponding to the direction of the axes Z1/Z2 and X corresponding to the direction of the axes Y1/Y2), thereby making it possible to compensate for the effect of pressure along these two axes.

Figure 5:
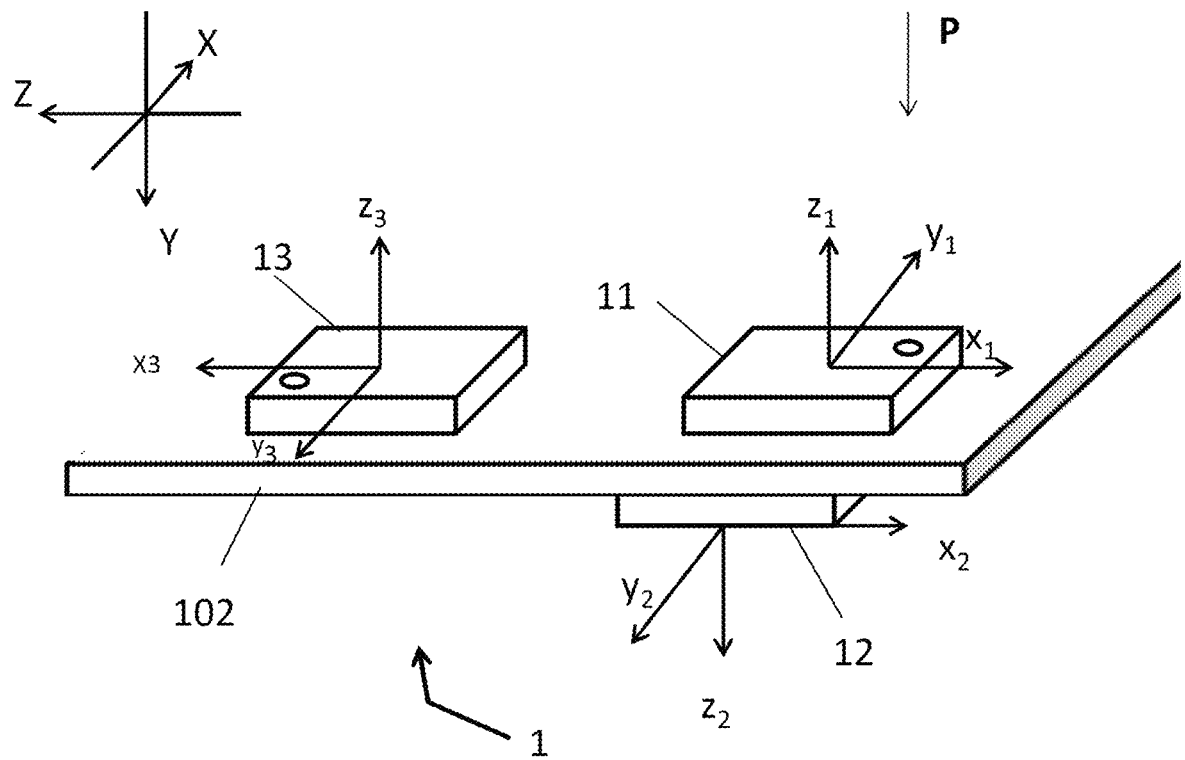
FIG. 5 shows an accelerometer device with three accelerometer sensors in a main reference system, according to one embodiment of the invention.

FIG. 5 shows an accelerometer device with three sensors. The positioning of the accelerometer sensors 11, 12 and 13 with respect to the main reference system (X, Y, Z) is such that:

the axis X1 of the first accelerometer sensor 11 coincides with the axis −Z of the main reference system;

the axis Y1 of the first accelerometer sensor 11 coincides with the axis X of the main reference system;

the axis Z1 of the first accelerometer sensor 11 coincides with the axis −Y of the main reference system;

the axis X2 of the second accelerometer sensor 12 coincides with the axis −Z of the main reference system;

the axis Y2 of the second accelerometer sensor 12 coincides with the axis −X of the main reference system;

the axis Z2 of the second accelerometer sensor 12 coincides with the axis Y of the main reference system;

the axis X3 of the third accelerometer sensor 13 coincides with the axis Z of the main reference system;

the axis Y3 of the third accelerometer sensor 13 coincides with the axis −X of the main reference system;

the axis Z3 of the third accelerometer sensor 13 coincides with the axis −Y of the main reference system.

The components of each sensor pair thus have components of opposite sign. Thus, for the pair {11, 12}:

the axes Y1, Y2 of the first and of the second sensor 11 and 12 face in opposite directions (corresponding to the direction of the axis X of the reference system); and the axes Z1, Z2 of the first and of the second sensor 11 and 12 face in opposite directions (corresponding to the direction of the axis Y of the reference system).

For the pair {11, 13}:

the axes X1, X3 of the first and of the third sensor 11 and 13 face in opposite directions (corresponding to the direction of the axis Z of the reference system); and the axes Y1, Y3 of the first and of the third sensor 11 and 13 face in opposite directions (corresponding to the direction of the axis Y of the reference system).

For the pair {12, 13}:

the axes X2, X3 of the second and of the third sensor 12 and 13 face in opposite directions (corresponding to the direction of the axis Z of the reference system); and the axes Z2, Z3 of the second and of the third sensor 12 and 13 face in opposite directions (corresponding to the direction of the axis Y of the reference system).

In a variant, the third sensor 13 may be mounted so as to face in the opposite direction along the axis Y with respect to the first sensor 11: the axes Z2 and Z3 of the second accelerometer sensor 12 and of the third accelerometer sensor 13, respectively, are then parallel and of opposite sign to the axis Z1 of the first accelerometer sensor 11, which corresponds to 2 pairs of accelerometer sensors mounted so as to face in opposite directions: 11/12 and 11/13. In a similar manner, the sensor 13 may be positioned at the level of the sensor 12.

Figure 6:
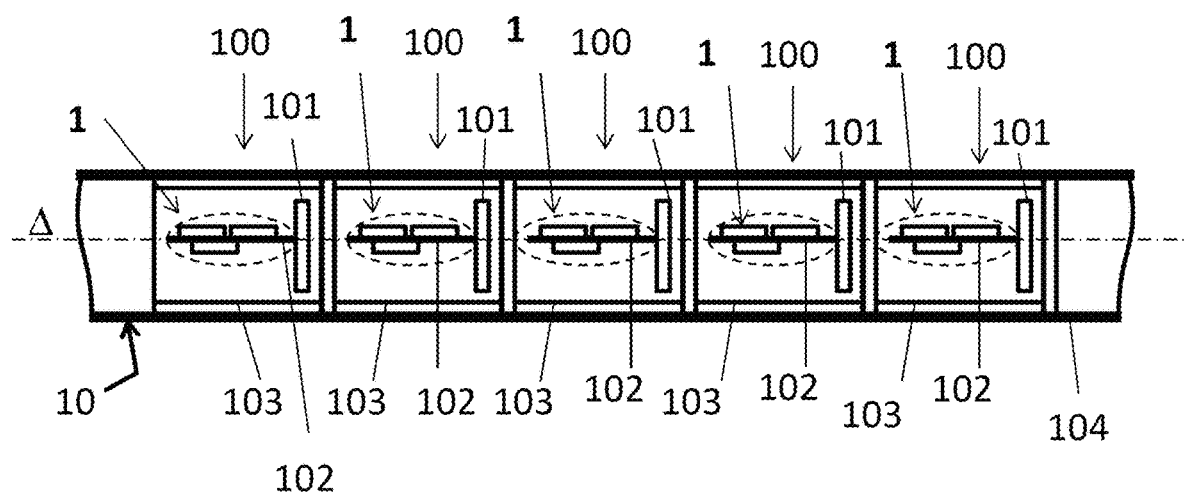
FIG. 6 is a schematic representation of the acoustic modules of a flute antenna comprising accelerometer devices with three accelerometer sensors, according to a certain embodiment of the invention.

Thus, when the accelerometer device comprises three sensors 11, 12 and 13 (3D), as illustrated in the examples of FIGS. 5 and 6, the mounting of the three accelerometer sensors so as to face in opposite directions is such that:

for each pair of sensors considered, for example {12, 13} and {11, 12}, the sensors have, in twos, components of opposite sign along two axes of the main reference system (for example, Z3/Z2 and X3/X2 for the pair {12, 13} or Z1/Z2 and Y1/Y2 for the pair {11, 12}); and the axes of the main reference system along which the components oppose the set of pairs of sensors comprise the three axes X, Y and Z of the reference system.

Thus, the components along the three axes X, Y, Z oppose the set of pairs, thereby making it possible to compensate for the effect of pressure along the three axes.

In one embodiment, each sensor 11, 12, 13 is an accelerometer sensor with three axes, of capacitive type, with high resolution and ultra-low power (such as described in the technical specifications of the Ultralow Power Digital Accelerometer component ADXL346 by Analog Devices).

It should be noted that although a number of sensors equal to three is suffi-cient to compensate for the effect of pressure on the three axes, the device may comprise a greater number of accelerometer devices.

Figure 7:
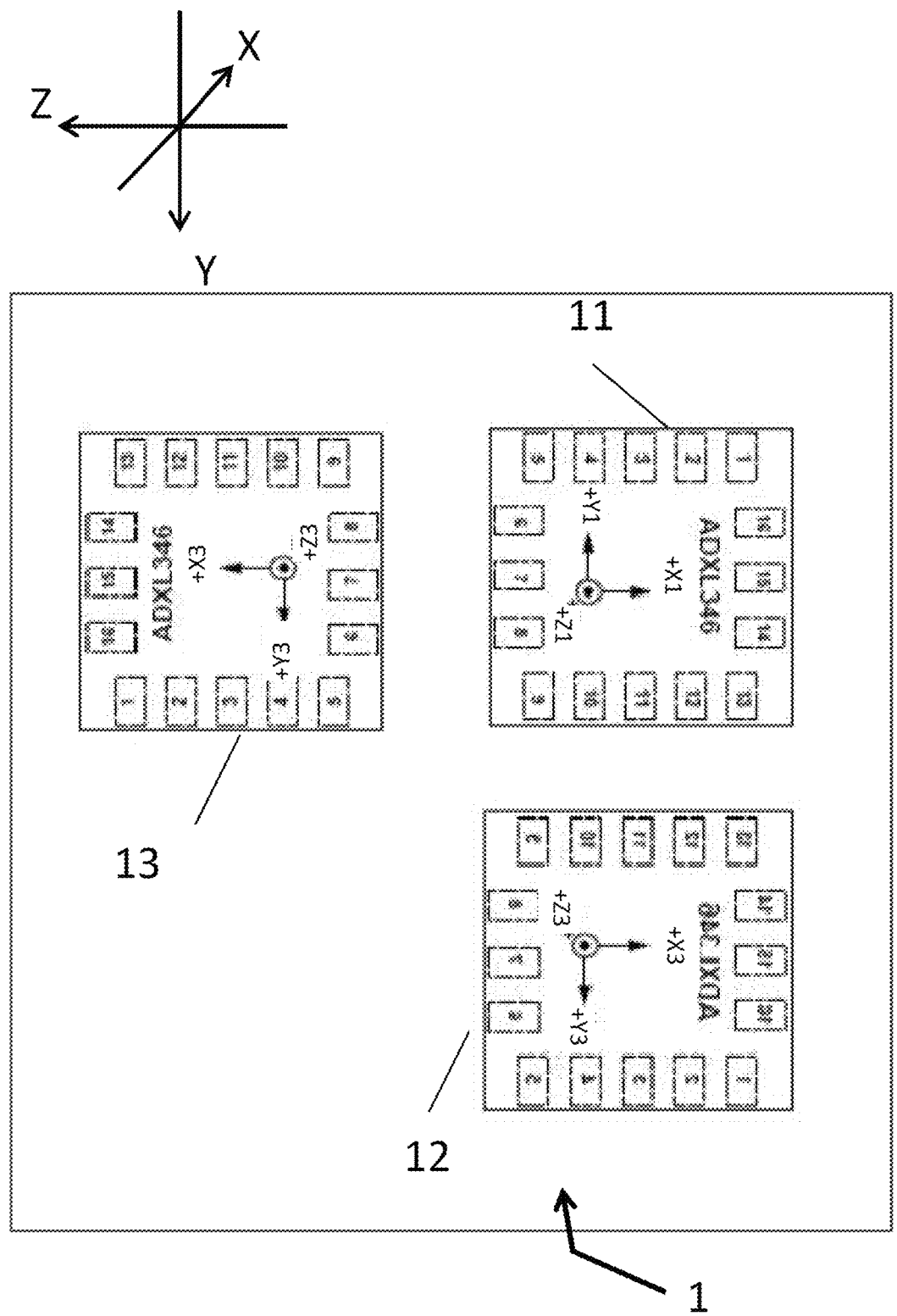
FIG. 7 is a top view of the accelerometer sensors facing in opposite directions in a main reference system, according to one embodiment of the invention.

FIG. 7 shows a schematic top view of the three accelerometer sensors 11, 12 and 13 of FIG. 5. In the example shown, each accelerometer sensor is a sensor of ADXL346 type in LGA (land grid array) format and comprises 16 connection pins denoted by 1 to 16. MEMS of LGA format are asymmetrically encapsulated in three dimensions such that the stresses which are exerted along the axis Z (which corresponds, in certain embodiments, to the vertical of the circuit) are higher than on the axes X, Y, which disrupts the capability of the sensors. MEMS of LGA type are therefore very sensitive to pressure. In particular, substantial drifts are observed on the axis Z of each of these sensors, for example of the order of 20% at 100 bars, and therefore also on the standard of the sensor (representing the value of the acceleration due to gravity) when the housing is subject to this pressure.

As MEMS are very sensitive to pressure, when submersed to substantial depths they may therefore deliver a highly inaccurate estimate of the acceleration owing to the high pressure exerted thereon. The pressure in the sheath is applied to the incompressible oil and to the MEMS.

The use of the accelerometer device according to the embodiments of the invention makes it possible not only to compensate for the effect of acceleration on the signals delivered by the acoustic multisensors but also to make the accelerometer sensors of MEMS type 11, 12, 13 insensitive to the pressure P which is exerted thereon, without information on the value of the pressure P.

By mounting the accelerometer sensors of MEMS type in such a configuration that they face in opposite directions, for each pair such as, for example, the pair {11, 12}, the difference in referencing due to the pressure exerted on the first sensor 11 (high sensor) is of opposite sign to the difference in referencing due to the pressure exerted on the second sensor 12. This makes it possible to compensate for the effect of the pressure exerted on the acoustic module on at least two axes.

Figure 8:
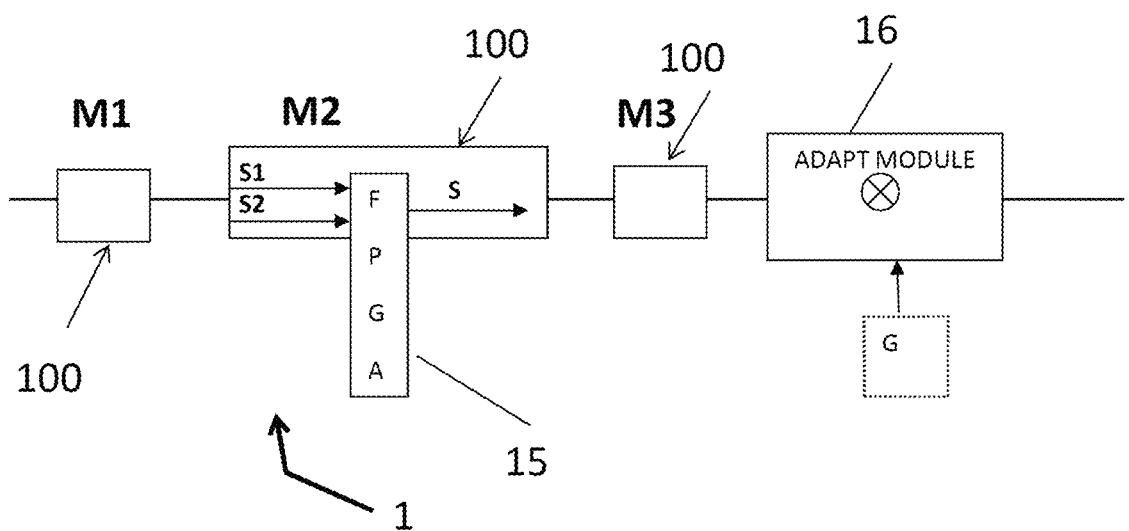
FIG. 8 is a diagram illustrating the processing of the signals measured by the accelerometer sensors facing in opposite directions, according to one embodiment of the invention.

FIG. 8 shows a schematic view of the antenna segment 10 comprising three acoustic modules M1, M2, M3 (100) showing the architecture for processing the signals measured by the sensors, according to one embodiment of the invention. In the example shown, only the module M2 is equipped with an accelerometer device 1 with two sensors S1 and S2 delivering accelerations along three axes and an associated acoustic sensor 101 (the elements 1 and 101 are not shown in FIG. 8).

The accelerometer device 1 may comprise a processing unit 15 (for example of FPGA, field programmable gate array, type) configured to calculate a mean (also referred to as a "reference") on each of the axes X, Y and Z of the accelerations measured by each pair of accelerometer sensors facing in opposite directions (11, 12) of the device 1 (mean of the components of opposite signs). For example, in the embodiments in which the device comprises more than N accelerometer sensors, one of which is a pair facing in opposite directions, mounted such that N−1 accelerometer sensors (upper sensors) are arranged on the upper part of the board while one sensor is mounted on the lower part (lower sensor), (N−1) pairs may potentially be considered for calculating the references per axis, each pair comprising one of the (N−1) upper sensors and the lower sensor. The references thus calculated make it possible to decrease the difference in acceleration due to the static pressure P which is exerted along each axis on the acoustic antenna.

In certain embodiments, the processing unit 15 may be used to calibrate the values of the accelerations along the three axes X, Y and Z prior to mounting the MEMS accelerometer sensors 11 and 12 and in order to improve the precision of the final estimate of the acceleration along three axes. The calibration makes it possible, in particular, to determine the positioning error with respect to the coding of each MEMS accelerometer sensor 11 and 12 (mechanical calibration). Furthermore, from the electrical standpoint, the accelerometer sensors may not be identical and locally in a stable position such that the measurements may be altered. The electrical calibration of the accelerometer sensors makes it possible to compensate for the architecture in order to obtain the expected values in terms of gain and offset. For example, by choosing the support of the acoustic sensor as a reference, the expected value for 1 g is 256 and for −1 g is −256, for each coordinate of the reference.

In the example of FIG. 8, the processing unit 15 of the accelerometer device of the module M2 (FPGA) allows the accelerometer sensors 11, 12 to be calibrated by finding the mean of the respective accelerations measured along the three axes S1=(X1, Y1, Z1) and S2=(X2, Y2, Z2) on the basis of the previously calculated calibration parameters.

In one embodiment, each accelerometer sensor may be calibrated individually (separately).

The calibration method may comprise the following steps:
before mounting the accelerometer device 1, for each accelerometer sensor 11 and 12 of the device 1, the calibration parameters (gains and offset) are estimated for each axis X, Y, Z on the basis of a series of measurements. In particular, an acceleration of 1*g along each axis of the accelerometer sensor is encoded as a known output value at the output of the sensor in the direction in question (the expected output value may be "256", for example). The measurements taken along each axis for each accelerometer sensor 11, 12 of the device and the comparison of the measurements with the expected value (e.g. "256") then allows the offset and the gain of each sensor along each axis to be estimated. The gain and the offset estimated for each sensor and for each accelerometer sensor axis 11, 12 of the device 1 (also referred to as "calibration parameters") may then be stored in memory among the constants of the FPGA device 15.

Under real conditions, for example in the sea, the FPGA processing device 15 may process the input acceleration values which comprise three values per accelerometer sensor 11, 12 of the accelerometer device 1, these three values corresponding to one acceleration value per axis X, Y or Z. Thus, for an accelerometer device 1 equipped with two MEMS accelerometer sensors, six values will be processed. This processing method consists of calibrating the set of these acceleration values (at least six values) using the calibration values predetermined in the calibration phase during the manufacture of the device 1 (stored in the FPGA device 15). More specifically, for each axis X, Y and Z, the mean of the pairs of calibrated values is calculated for each pair of accelerometer sensors 11 and 12 comprising two sensors facing in opposite directions.

The prior calibration phase allows precision to be increased and the error offset to be decreased. It also allows the installed function to be tested, in particular during integration and in the maintenance phase for various types of MEMS accelerometer sensors, thereby decreasing risks.

It should be noted that the initial calibration phase is an optional phase which may or may not be implemented depending on the level of precision sought.

In addition, the acoustic antenna may comprise an adapter module 16 for applying a gain compensation factor G (also referred to as a scale factor) which may be applied in order to rescale the calibrated acceleration values (mean calculated for each axis). The scale factor G allows the dynamics of the numbers to be adapted in order to be able to carry out the calculations using a simpler computer (for example using integers and not numbers with decimal points).

Figure 9:
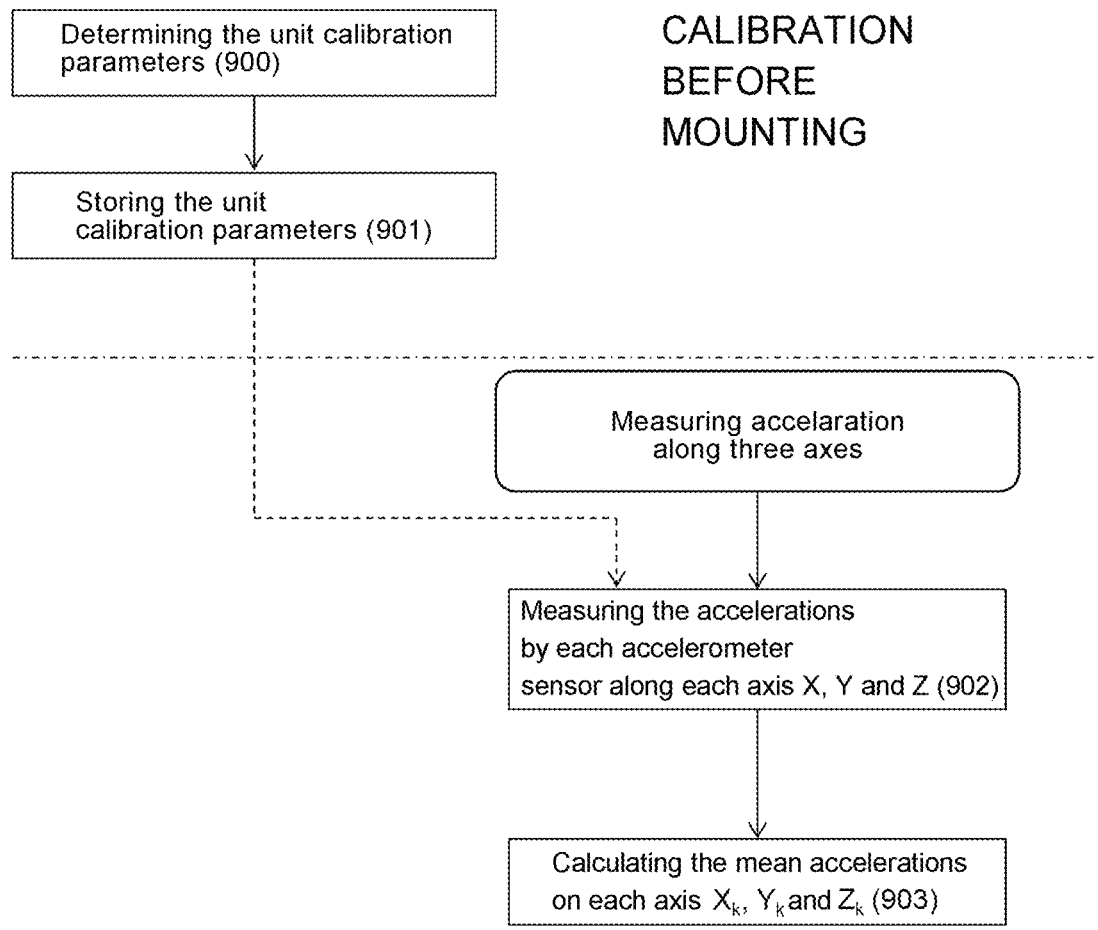
FIG. 9 is a flowchart showing the steps of calculating references along each axis of the principal reference system, according to one embodiment of the invention.

FIG. 9 is a flowchart representing the method for calculating the acceleration values calibrated for an accelerometer device 1 with three accelerometer sensors comprising at least two sensors facing in opposite directions (k pairs of accelerometer sensors).

The method may be implemented with the chosen periodicity (for example every 50 ms). The method is, in particular, implemented for each pair of MEMS accelerometer sensors (arranged so as to face in opposite directions) of the accelerometer device 1.

In order to aid in understanding the description which follows, the following notation has been defined for each of the k pairs of accelerometer sensors of the accelerometer device 1 (one pair is composed of two sensors arranged so as to face in opposite directions comprising an upper sensor, e.g. 11, and a lower sensor, e.g. 12):

$b_{x,k,sup}$, $b_{y,k,sup}$, $b_{z,k,sup}$ denote the offsets of the upper accelerometer sensor facing in opposite directions (e.g. 11) along each axis X, Y, Z, respectively;

$b_{x,k,inf}$, $b_{y,k,inf}$, $b_{z,k,inf}$ denote the offsets of the lower accelerometer sensor facing in opposite directions (e.g. 12) along each axis X, Y, Z, respectively;

$g_{x,k,sup}$, $g_{y,k,sup}$, $g_{z,k,sup}$ denote the gains of the upper accelerometer sensor facing in opposite directions (e.g. 11) along each axis X, Y, Z, respectively;

$g_{x,k,inf}$, $g_{y,k,inf}$, $g_{z,k,inf}$ denote the gains of the lower accelerometer sensor facing in opposite directions (e.g. 12) along each axis X, Y, Z, respectively; and G denotes the scale factor for the gain compensation.

In step 900, each accelerometer sensor of the accelerometer device 1 is calibrated before mounting the sensors in order to determine the gain and the offset of each accelerometer sensor along each axis of the sensor Xi, Yi, Zi (calibration parameters). In step 901, the calibration parameters are subsequently stored in the processing unit 15.

Once the device 1 has been mounted on an acoustic antenna, in step 902, the accelerations may be measured by each sensor along each axis X, Y and Z.

In step 903, for each pair k comprising two sensors facing in opposite directions (for example 11, 12 and 12, 13 in the example of FIG. 5), the acceleration components $X_k$, $Y_k$ and $Z_k$ calibrated along each of the axes X, Y or Z are determined by finding the mean of the values measured by the various sensors along the corresponding axis. The calculation of the mean on each axis may take into account the calibration parameters such as the gain and/or the offset of each sensor along the axis and/or the G factor. In one embodiment, the mean acceleration components $X_k$, $Y_k$ and $Z_k$ may be obtained via the following equations:

$$X_k = G * \frac{(Y_{k,1} - b_{y,k,1}) * \frac{1}{g_{y,k,1}} - (Y_{k,2} - b_{y,k,2}) * \frac{1}{g_{y,k,2}}}{2}$$

-continued $$Y_k = G * \frac{-(Z_{k,1} - b_{z,k,1}) * \frac{1}{g_{z,k,1}} + (Z_{k,2} - b_{z,k,2}) * \frac{1}{g_{z,k,2}}}{2}$$

$$Z_k = G * \frac{-(X_{k,1} - b_{x,k,1}) * \frac{1}{g_{x,k,1}} - (X_{k,2} - b_{x,k,2}) * \frac{1}{g_{x,k,2}}}{2}$$

Those skilled in the art will understand that steps 900 and 901 are carried out prior to steps 902 and 903 without time limitation. Furthermore those skilled in the art will understand that the values obtained in step 901 may be used for multiple measurements in steps 902 and 903.

The accelerometer device 1 based on MEMS sensors according to the embodiments of the invention thus makes it possible to compensate for the effect of the pressure P exerted on the antenna. The inventors have, in particular, carried out pressure tests from 0 to 60 bars over 35 trials with MEMS accelerometer sensors of eight different types. Within the context of such tests, a referencing offset of +−1 lsb (standard deviation of 0.3) has been observed on the X and Y axes and a referencing offset of +−2 lsb (standard deviation of 1) on the Z axis.

In the embodiments in which the sensitivity to pressure of the sensors of the accelerometer device varies, it is possible to take into account this varying sensitivity using the error law due to pressure and the positioning of the sensors.

The accelerometer device 1 thus provides a low-cost solution for measuring the acceleration of an acoustic antenna and compensating for the effect of pressure. In certain acoustic applications of the invention, it has been observed, in particular, that the accelerometer device may be used up to 100 bars (1000 m) with a good level of resistance up to 500 bars (5000 m).

The accelerometer device 1 is also less bulky, thereby allowing a plurality of boards 102 to be stacked in order to ensure continuous operation in the event of failure.

The accelerometer device additionally allows the error rate of 20% observed with the conventional accelerometer devices to be brought down to a rate equal to 1%. It also allows redundancy in the values and therefore reliability to be improved.

The accelerometer device 1 also has a good level of endurance and reliability over time. It has been observed in particular that the pressure sensitivity of an MEMS sensor is constant over time for the entire life of the device.

The invention is not limited to the embodiments described hereinabove by way of non-limiting example. It encompasses all the variant embodiments that may be envisaged by the person skilled in the art. In particular, the invention is not limited to an accelerometer sensor of MEMS type (11, 12). Nor is it limited to a particular number of accelerometer sensors or to a particular arrangement of the accelerometer device in an associated acoustic module. Furthermore, the calibration phase in steps 900 and 901 may be omitted in certain embodiments or implemented differently.

More generally, the invention is not limited to one application of the accelerometer device with an acoustic antenna of flute type and may be used to measure the acceleration along three axes of any object to which it is mechanically connected. The invention may be used, for example, to remove the left/right ambiguity found in submarine acoustic detection or else to determine the direction of an object in space. In particular, the accelerometer device 1 may be used, for example, upon stopping to measure the terrestrial gravity in a mode referred to as "self-test". The output of the processing unit 15 may, in particular, be used by a position adjustment mechanism (not shown) in order to adjust the position of the object on the basis of references calculated by the processing unit 15 along each axis, according to a control loop.

The invention claimed is:

1. An accelerometer device for determining the acceleration of an acoustic antenna to which the accelerometer device is mechanically connected, along three axes X, Y and Z of a main orthonormal reference system comprising three axes X, Y, Z, said acoustic antenna being subject to a surrounding pressure, the acoustic antenna comprising at least one acoustic module comprising one or more acoustic sensors mounted on at least one printed circuit board, said acoustic sensors delivering electric signals using acceleration references provided by said accelerometer device, wherein the accelerometer device comprises a set of accelerometer sensors of MEMS type comprising N accelerometer sensors, said number N of accelerometer sensors being at least equal to two, said accelerometer sensors being mounted on said at least one printed circuit board, each accelerometer sensor being configured to determine the acceleration of said acoustic antenna according to each axis X, Y, Z, the position of each sensor being defined in an auxiliary reference system comprising three orthonormal axes Xi, Yi, Zi, the plane (Xi, Yi) defining the plane of each accelerometer sensor and being parallel to the plane (X, Z) of said main reference system, said set of accelerometer sensors comprising at least one pair of accelerometer sensors mounted on either side of said at least one printed circuit board, and wherein:
for each pair of accelerometer sensors, the sensors of the pair have components of opposite sign along two axes of the main reference system; and
the axes of the main reference system along which the components of the accelerometer sensors of said at least one accelerometer sensor pair have opposite signs comprise at least two of the three axes X, Y and Z of the main reference system to compensate for the effect of the pressure on at least two axes of the main reference system.

2. The accelerometer device as claimed in claim 1, wherein said set of accelerometer sensors comprises two accelerometer sensors connected to said at least one printed circuit board, and the effect of the pressure which is exerted on the acoustic antenna being corrected along the two axes of the main reference system.

3. The accelerometer device as claimed in claim 1, wherein said set of accelerometer sensors comprises three sensors, and the effect of the pressure which is exerted on the acoustic antenna being corrected along the three axes of the main reference system.

4. The accelerometer device as claimed in claim 1, wherein the sensitivity of the accelerometer sensors to pressure varies.

5. An acoustic module for an acoustic antenna extending along a main axis, comprising an accelerometer device as claimed in claim 1, wherein the accelerations determined by the accelerometer device along each axis X, Y and Z are such that they compensate for the effect of the acceleration of the acoustic antenna on the position of said at least one acoustic multisensor.

6. The acoustic module as claimed in claim 5, wherein said at least one acoustic sensor has an axis substantially parallel to the axis of the antenna.

7. The acoustic module as claimed in claim 1, wherein said at least one printed circuit board comprises a plurality of printed circuit boards stacked substantially perpendicularly to the axis of the antenna.

8. An acoustic antenna, comprising a set of acoustic modules as claimed in claim 5.

9. The accelerometer device of claim 1, further comprising a processing unit configured to determine an acceleration reference for each axis of the reference system from the accelerations measured for each pair of accelerometer sensor.

10. The accelerometer device of claim 9, further comprising a positioning adjustment mechanism for adjusting the position of said antenna based on the acceleration references determined by said processing unit along each axis.

11. The accelerometer device as claimed in claim 9, wherein the acceleration reference for each axis of the main reference system is the mean of the accelerations determined by each pair of accelerometer sensors along said axis.

12. The accelerometer device as claimed in claim 11, wherein the calculation of the mean of the accelerations along the axis further takes into account the gain and/or the offset of each sensor predetermined in a unit calibration phase implemented separately for each sensor before mounting.

13. The accelerometer device as claimed in claim 11, wherein the calculation of the means of the accelerations along the axis further takes into account a predefined gain compensation factor.

\* \* \* \* \*